United States Patent Office 2,875,893
Patented Mar. 3, 1959

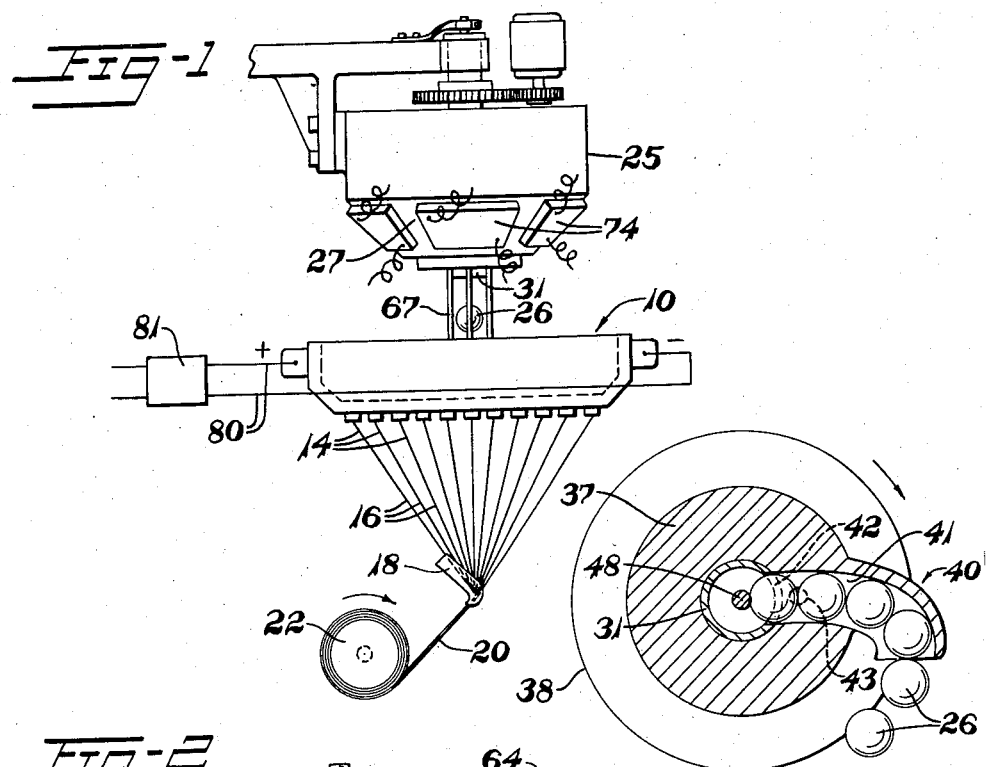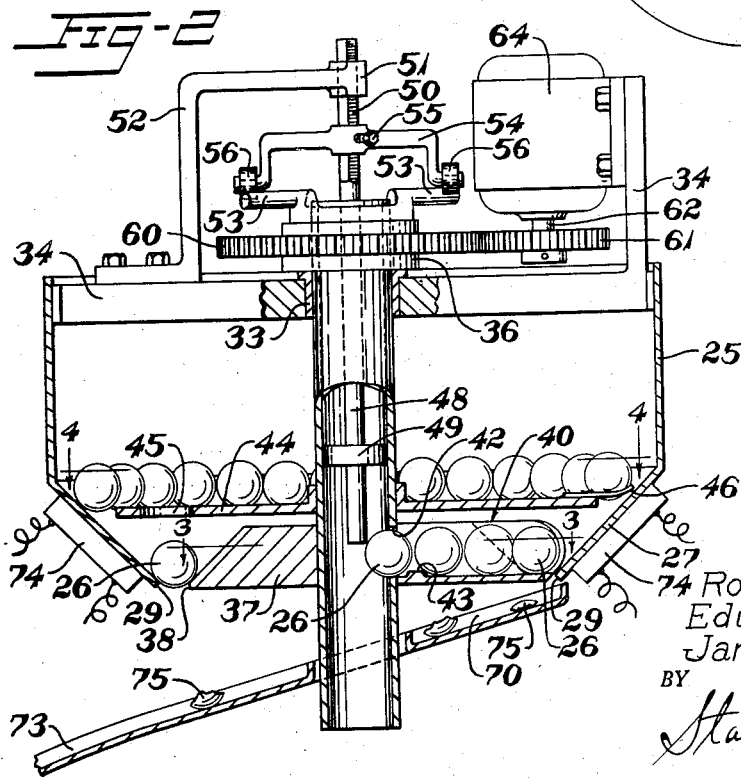

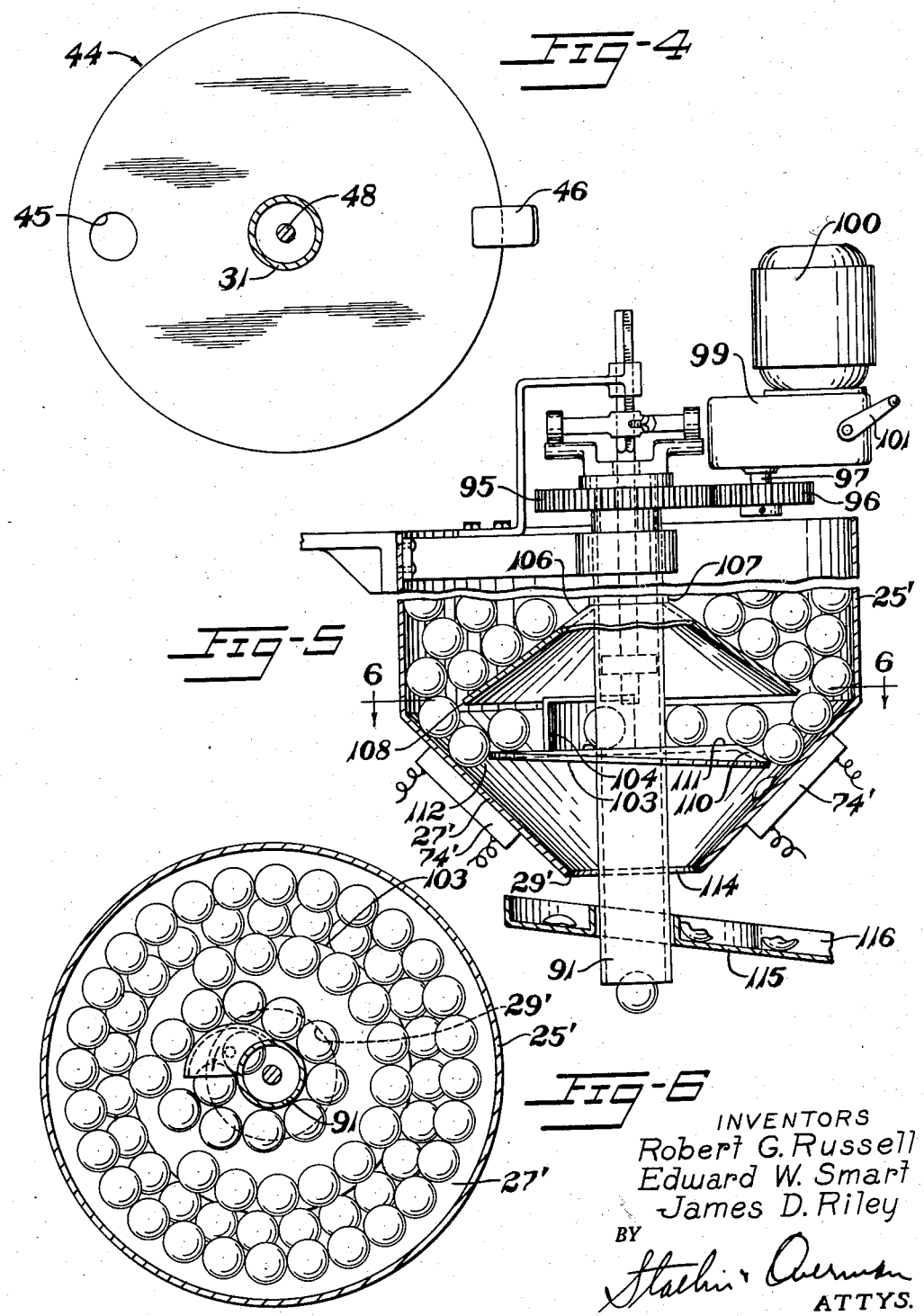

2,875,893

APPARATUS FOR PRODUCING THERMOPLASTIC FIBERS

Robert G. Russell, Granville, and Edward W. Smart and James D. Riley, Newark, Ohio, assignors to Owens-Corning Fiberglas Corporation, a corporation of Delaware Application August 13, 1953, Serial No. 374,044

11 Claims. (Cl. 209—11)

This invention relates to an improved method and apparatus for producing fibers from heat-softenable materials and more especially to method and apparatus for metering or periodically delivering bodies of heat-softenable material to a material softening zone or receptacle at which the material is softened and streams of the softened material attenuated into fibers.

In certain continuous fiber-forming processes now in use, it is a practice to deliver glass cullet in the form of spherically shaped bodies to a feeder or melting receptacle which is heated electrically or by other means to a temperature sufficiently high to melt or render the glass flowable. The feeder or melting receptacle is formed with a plurality of orifices or openings at the bottom wall thereof through which the glass or other heat-softened material is discharged in the form of streams. The streams of glass or other material are attenuated to fine fibers by suitable means such as by gathering the fibers or filaments into a strand and winding the strand upon a suitable collecting drum. The streams may be attenuated by other means such as by directing the strand of fibers or filaments between pull rolls moving at high speeds of rotation whereby the streams are drawn into continuous fibers or filaments in strand formation.

An objective in these processes is to produce continuous fibers which are of a substantially constant or uniform diameter as uniformity in fiber or filament size is highly desirable or necessary in utilizing strands of the filaments or fibers for textile uses and purposes. One of the difficulties in endeavoring to produce fibers of a uniform diameter is that of maintaining the requisite amount of fiber-forming material in the feeder or melting receptacle to replace the material discharged through the orifices in the feeder.

An arrangement for periodically delivering bodies of glass or other fiber-forming material to a feeder or melting receptacle is shown in the patent to A. L. Simison, No. 2,482,071. The arrangement of the character disclosed in this patent contemplates the use of perfectly closed in, spherically shaped bodies of fiber-forming material delivered to the receptacle at periodic intervals. In commercial adaptation, however, the bodies of glass cullet or marbles become broken or chipped or are initially incompletely formed and, hence, the delivery of defective, misshapen, undersized bodies or broken fragments of bodies causes the volume or amount of material in the melting receptacle to vary and such variations directly affect the characteristics of the streams of material discharged from the feeder.

One of the objects of the present invention is the provision of a method and apparatus for metering or delivering bodies of glass or other fiber-forming material to a melting receptacle or zone in which the rate of delivery or the metering of properly sized bodies is obtained so as to establish a substantially constant volume of the fiber-forming material in the receptacle or melting zone replacing the material discharged therefrom.

An object of the invention is the provision of a method and means of delivering glass cullet to a melting receptacle or feeder in a manner whereby the glass discharged from the receptacle is substantially continuously replaced so that a constant amount of glass is continuously maintained in the receptacle.

Another object of the invention resides in a method and means of preheating the glass cullet or bodies prior to their delivery into the feeder or melting receptacle so that a comparatively small amount of heat in the melting receptacle is required to bring the newly delivered glass in the receptacle to a flowable state and thereby minimize the temperature variations due to the admission of cullet from a supply to the feeder.

Another object of the invention is the provision of an apparatus for delivering bodies of heat-softenable fiber-forming material to a feeder at a substantially constant rate and wherein only bodies of a predetermined volume are delivered to the feeder so that an accurate regulation of material in the feeder may be maintained.

Another object of the invention resides in the provision of an apparatus for intermittently and successively delivering bodies of glass of predetermined size and volume into a melting feeder in a manner whereby the intervals between the successive delivery of the bodies into the feeder are sufficient to enable each body to be brought to substantially the temperature of the molten glass in the feeder without materially varying the temperature or viscosity of the glass in the feeder.

Another object of the invention resides in an apparatus especially adapted to deliver bodies of fiber-forming material of a definite size and shape into a feeder and wherein bodies that are of greater size or of a different or defective shape or fragments of broken bodies are prevented from being delivered into the feeder.

Another object of the invention resides in a method and apparatus wherein glass cullet in the form of spherical bodies of glass which have been preheated are delivered into a melting feeder, the bodies being intermittently and successively discharged into the feeder so that there is substantially no loss of heat from the bodies during their traverse from the discharge means to the melting feeder whereby an improved melting rate is established in the feeder and a more uniform and better quality of glass is obtained.

Another object of the invention resides in preheating the glass cullet or glass bodies prior to their delivery into the feeder wherein the preheating means may be accurately controlled at a temperature minimizing the transfer of occluded gases into the feeder with the glass cullet or bodies.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a semidiagrammatic view illustrating a form of fiber producing apparatus in conjunction with a material feeding apparatus for carrying out the method of the invention;

Figure 2 is a vertical sectional view illustrating one form of apparatus for metering and delivering bodies of fiber-forming material from a supply;

Figure 3 is a horizontal sectional view taken substantially on the line 3—3 of Figure 2;

Figure 4 is a horizontal sectional view taken substantially on the line 4—4 of Figure 2 with the bodies of fiber-forming material removed;

Figure 5 is a vertical sectional view illustrating another form of arrangement of metering and discharging bodies of fiber-forming material from a supply, and Figure 6 is a horizontal sectional view taken substantially on the line 6—6 of Figure 5.

The method and apparatus of the present invention are particularly adaptable for use in forming fibers from streams of molten glass, but it is to be understood that the present invention may be utilized to advantage in forming fibers from other heat-softenable materials such as fusible rock or other heat-softenable minerals, fiber-forming resins and the like.

The arrangement disclosed in the drawings is illustrative of the use of the invention for forming fibers from mineral material such as glass which is heat-softened or rendered molten in a suitable heating zone and streams of the softened material discharged from the heating zone are attenuated to continuous filaments or fibers by suitable means engageable with the fibers or filaments. With reference first to Figure 1, there is illustrated a semidiagrammatic representation of apparatus for carrying out a method of forming fibers wherein a melting receptacle or feeder 10 is adapted to contain a body or quantity of glass in a molten or heat-softened condition. The bottom wall of the feeder 10 is formed with a plurality of orifices through which the softened glass flows in the form of streams 14. As the streams 14 move away from the feeder, they are chilled or reduced in temperature and, hence, become solidified into fiber or filament form. The filaments or fibers 16 so formed are gathered together by a suitable gathering means or guide 18 to form a strand 20. In the illustration of Figure 1, the attenuating means is in the form of a strand collecting drum or spool 22 about which the strand is wound, the drum being supported for rotation at a comparatively constant rate of speed. Thus, by rotating the drum 22, the streams 14 are attenuated or drawn into fine filaments or fibers 16 before they reach the solidification state, and the strand 20 of filaments is wound upon the collecting drum or spool 22 at a linear rate of 10,000 linear feet or more per minute. The fineness of the filaments or fibers may be controlled, in a measure, by modifying the rate of attenuation through variation in the speed of the strand collecting drum 22. The uniformity of the diameters of the filaments or fibers formed from the streams is dependent in a measure upon the maintenance of a constant viscosity of the entire supply of fiber-forming material in the feeder. If temperature and hence viscosity fluctuations exist in the feeder, the filaments or fibers attenuated from the streams are not of uniform size. It is, therefore, imperative that temperature fluctuations in the fiber-forming material in the feeder be reduced to a minimum to avoid material variations in viscosity of the streams. It has been a practice to deliver bodies of glass into the feeder in a manner wherein a column of the glass bodies is maintained above the feeder so that, upon the softening or melting of the lowermost body of glass in the feeder, the next succeeding body moves into the feeder and is reduced to a softened or molten condition. The bodies of glass so introduced into the feeder are in a substantially cold, solidified state and are eventually rendered molten by absorption of a comparatively large amount of heat from the molten glass in the feeder. Such transfer of heat to the glass bodies supplied to the feeder under certain conditions of operation may cause substantial fluctuations in temperature and hence viscosity of the material in the feeder. An example of one method of delivering glass bodies or marbles to a feeder is the Simison Patent No. 2,482,071. The arrangement of the patent is adapted to deliver spherical bodies of glass, which are presumed to be of a particular size, into the feeder at intervals in order to maintain a supply of molten glass in the feeder. However, many of the glass bodies or marbles are chipped or broken or are of improper size so that predetermined rate of release of bodies into the column of bodies above the feeder is not necessarily determinative of the amount required to replace the glass flowing from the feeder because of the variation in size or shape of the glass bodies and fragments of bodies delivered to the feeder.

A phase of the present invention involves the delivery of properly sized bodies or marbles of glass or other fiber-forming material at a substantially constant or metered rate substantially equal to the rate at which the material from the feeder is discharged therefrom in the form of streams in order to maintain a substantially constant level or head of molten material in the feeder. The arrangement of the invention is inclusive of a method and means of preheating the bodies or marbles of glass to a temperature approaching but below the softening temperature of the glass in order to reduce or minimize the amount of heat acquired by the bodies from the molten material in the feeder to transform them to a flowable condition.

A form of apparatus for feeding and conditioning the glass cullet before it is delivered into the feeder is illustrated in Figures 1 through 4. The apparatus includes a container or hopper 25 adapted to receive a supply of glass batch in the form of small spheres or marbles 26 of a diameter of about three-quarters inch. The hopper 25 is shaped with an inwardly flared or frustoconically shaped wall portion 27, the lower edge 29 defining a central circular opening. Disposed centrally of the hopper 25 is a tube or hollow member 31 which has its upper end extending through a bearing means or bushing 33 mounted in a support 34. The tube 31 is journaled for rotation relative to the support 34 in the bearing 33, the upper portion of the tube being formed with a flange 36 to position the tube relative to the support. The tube 31 depends downwardly and is preferably axially disposed relative to the circularly shaped hopper 25, the tube forming a means for delivering spherical glass pieces 26 into the feeder 10 shown in Figure 1.

Supported upon the tube 31 adjacent the lower open end of the container or hopper 25 is a fitting or member 37 of circular shape having its periphery 38 spaced from the lower edge 29 of the hopper wall a distance less than the diameters of the spherical bodies or marbles of glass whereby an annular row of marbles is supported between the periphery 38 of the fitting 37 and the lower edge 29 as shown in Figure 2.

The fitting or member 37 is formed with a spoon-like configuration or bucket 40 which extends generally radially of the axis of the tube and fitting in the manner shown in Figure 3. The curved configuration or shape of the scoop or bucket 40 provides a passage 41 for conducting the marbles or bodies of glass toward the tube 31. The tube 31 is formed with a passage 42 of sufficient size to permit a marble of glass to enter the tube.

For metering purposes, the construction is arranged so that one marble only is delivered into the tube through the passage 42 at predetermined intervals. Means is provided for preventing the marble adjacent the tube from passing into the tube until released by mechanism brought into periodic operation during rotation of the tube. Disposed within tube 31 is a rod 48 for effecting the release of a single marble or spherical body of glass from the supply for delivery into the tube. The rod 48 is centered in the tube by means of a collar 49, the upper end zone being of square or polygonal configuration as at 50, which portion is slidably received in a correspondingly shaped opening formed in a boss 51 of a support 52. Through the use of the square or polygonal shape of the rod and the cooperating reciprocal shape in the boss 51, the rod 48 is prevented from rotation but is arranged for relative vertical slidable movement.

Mounted upon the rod 48 is a bracket or U-shaped member 54 adjustably secured to the rod by means of a set screw 55. The extremities of the leg portions of the bracket 54 are equipped with rollers 56 which are journally supported thereon. Secured to the upper end portion of the tube 31 is a fitting provided with a pair of diametrically opposed, radially projecting portions or rods 53 adapted to periodically contact the rollers 56 during rotation of the tube 31 and cause a rapid elevation of the rod 48. The bracket 54 is adjusted so that a minimum vertical movement of the rod 48 is required to release the marble in the passage 42 in readiness to be moved into the interior of the tube 31. It is imperative that the rod 48 be returned quickly to avoid cascading of the remaining marbles in the passage 41 into the tube 31. Thus the diameters of the cam or rod portions 53 are kept at a minimum in order to elevate the bracket 54 quickly and permit its rapid return to its lowermost position as shown in Figure 2. In the arrangement shown in Figure 2, a marble is delivered into the tube 31 at each 180° of rotation of the tube.

Means is provided to prevent cascading of the marbles in passage 41 when the lead marble moves into the interior of the tube 31. The upper surface of the bottom wall of passage 41 is provided with a slightly elevated portion or abutment 43 which is engaged by the next succeeding marble in the passage momentarily delaying it in its movement toward the opening in tube 31 during discharge of the lead marble. This interval of time is sufficient to enable return of the metering rod 48 to its lowermost position. The pressure of the remaining marbles in the passage 41 and in the annular row adjacent the member 37 moves the new lead marble over the abutment 43 and rod 48 prevents its delivery into the tube 31 until cams 53 again elevate the bracket 54 and rod 48 to admit the passage of the lead marble.

Disposed in the hopper or container 25 in this form of construction is a plate or platform 44 which is secured to and rotates with the tube 31. The plate 44, in effect, forms a false bottom for the hopper and supports the bulk of marbles or bodies of glass in the hopper. By this means the fitting 37 is relieved of the weight of the glass except for the weight of the annular row of marbles engaging the fitting 37. The plate 44 is formed with an opening 45 of sufficient dimension to admit the passage of a marble therethrough to replace the marble moving into the tube 31. Hence, there is always an annular row of marbles adjacent the fitting 37, and as soon as one marble is discharged from passage 41 into the tube 31, another marble above the plate 44 passes through the opening 45 into the annular row adjacent the fitting. The plate 44 is preferably provided with a radially extending finger 46 which extends to a point adjacent to but out of contact with the tapered wall 27 of the hopper and serves to continuously agitate the supply of glass bodies in the hopper to assure the replenishment of the marbles delivered through the passage 45 to the zone adjacent the fitting 37.

Secured upon the tube 31 is a spur gear 60 which is in mesh with a gear 61 mounted upon a shaft 62 driven by an electrically energized motor 64. Rotation of the motor 64 causes the spur gear 61 to rotate spur gear 60 and, hence, the tube 31, plate 44 and fitting 37. As the fitting or member 37 rotates in the hopper, the scoop or bucket 40 is filled with marbles 26 and member 37 moves the annular row of marbles in a rotative orbit. When the rods or cams 53 engage the rollers 56, the bracket 54 and metering rod 48 are elevated, permitting the lead body or marble in the scoop 40 to move by gravity through the passage 42 into the interior of tube 31, the glass piece or marble falling by gravity through the lower zone or portion of tube 31 through a chute 67 into the melting zone of the feeder 10. In this manner the pieces, spheres or marbles of glass 26 are delivered at predetermined regular intervals, the rate of delivery being dependent upon the speed of the motor 64. The speed of the motor 64 may be varied by conventional means (not shown) to regulate the rate of delivery of the glass spheres 26 into the melting feeder 10. By this method and arrangement glass batch in the form of spherical pieces 26 is delivered at regular intervals into the feeder 10 at the same rate that the supply of molten glass in the feeder is depleted through the streams 14 flowing therefrom.

In the formation and handling of the spherical glass pieces or marbles, some are improperly formed or shaped and others become chipped or broken. Should the defective marbles or fragments be delivered into the feeder 10, the equilibrium of the glass supplied to the feeder and that withdrawn therefrom would be impaired. The apparatus of the invention includes means for disposing of undersized pieces and broken pieces of glass to avoid their delivery into the melter or feeder 10. As shown in Figure 2, a receptacle 70 may be arranged beneath the central circular opening in the bottom of the hopper 25. The receptacle is adapted to receive defective pieces and fragments that pass through the annular passage between the edge 29 of the hopper wall 27 and the periphery of the fitting or member 37. The waste receptacle may be equipped with a chute 73 for conveying the broken pieces of glass indicated at 75 away from the receptacle 70. As the opening 45 in the plate 44 is of a dimension to permit the passage of correctly sized bodies or marbles, oversized marbles or bodies are thereby trapped above the plate 44 and may be easily removed from the hopper.

Another feature of the invention lies in the method and apparatus for preheating the spherical glass pieces prior to their delivery into the melter or feeder 10. Disposed adjacent or associated with the frusto-conical surface 27 of the hopper 25 is a plurality of heating means or units 74 for preheating the glass pieces disposed in the hopper 25. The marble preheating means 74 may be in the form of electrical resistance units energized from a suitable power supply (not shown). The current flowing through the heating units may be controlled to vary the temperature of the units and, hence, control the temperature of the glass pieces within the hopper. By preheating the spherical glass pieces 26 in the hopper to a temperature of about 1000° F., a temperature approaching but below the softening point of the glass, the preheated pieces, upon being discharged through tube 31 and chute 67 into the molten glass within the melter or feeder 10, are quickly reduced to molten condition upon their contact with and absorption of heat from the molten glass in the feeder. By reason of the step of preheating the pieces in the receptacle, a comparatively small amount of heat from the glass in the melter 10 is required to reduce each piece to molten state upon its delivery into the feeder. Through this arrangement, the temperature of the molten glass in the feeder is not appreciably changed by reason of the heat down therefrom to reduce the glass pieces to molten state. Hence, the viscosity of the glass contained in the feeder 10 is maintained substantially constant and the streams flowing therefrom produce continuous fibers or filaments of substantially uniform size.

While the hopper 25 and associated mechanism may be disposed in any position above the feeder or melter 10, it is desirable, in order to secure high heating efficiency, to dispose the hopper as near the feeder as is practicable.

One of the advantages of the present invention is the correlation of the feed of the glass batch into a melting zone at the same rate that molten material is removed from the melting zone. It may be desirable under certain conditions of operation or to change the size of the filaments formed from the streams to vary the rate of feed of the glass batch discharged from the batch feeding device or to change the viscosity of the molten material in the melting zone as the viscosity affects the rate of flow of streams of material from the melter. If it is desired to regulate the rate of discharge of glass batch from the feeding device, this may be accomplished by varying the speed of the motor 64 through conventional current controls or by utilizing variable speed driving means between the motor shaft 62 and the tube 31. If a control of viscosity of the glass in the melter 10 is desired, this may be accomplished by varying the amount of current flowing through the electrical heating circuit 80 through the use of current regulating means contained within a housing 81. It is to be understood that the batch preheating units 74 are preferably of the electrical type and control of the temperature of the preheating zone may be had by controlling the current flow through the heating units 74.

Figures 5 and 6 illustrate a modified form of marble feeding or metering mechanism. In this arrangement, a hopper 25' is equipped with a centrally disposed tube 91 of substantially the same construction as tube 31. The tube 91 is provided with a gear 95 meshing with a gear 96 mounted upon a driving shaft 97. The driving shaft 97 is driven through gear reduction mechanism contained within a housing 99 which, in turn, is operated by an electrically energizable motor 100. The variable speed drive mechanism contained within housing 99 may be regulated or controlled by an operating handle 101 to vary the speed of rotation of the tube 91, and, hence, the rate of discharge of glass bodies from the feed mechanism. Secured to the tube 91 is a platform 103 upon which is mounted a bucket or scoop 104. The wall of tube 91 adjacent the scoop 104 is provided with an opening of a size to permit a spherical glass body to pass from the scoop into the interior of the tube 91 in substantially the manner described in connection with the form of the invention shown in Figures 2 and 3.

Fixedly secured upon the tube 91 is a frusto-conically shaped hood or shield 106 which has a flange portion 107 welded to the wall of tube 91. The lower peripheral terminus 108 of the shield 106 is spaced from the tapered bottom portion 27' of the hopper 25' a distance just sufficient for the sperical bodies or marbles 26' of glass to move through the annular passage defined by the peripheral terminus 108 of the shield 106 and the wall of the conically shaped portion 27' of the receptacle. This arrangement functions as a screen to prevent oversize marbles or bodies from reaching the zone of the platform 103.

The platform 103 has an inclined ramp portion 110 which, during rotation, tends to convey the marbles or spherical bodies onto the horizontal portion 111 of the platform 103. One of the advantages of utilizing the inclined ramp is that the bodies may be fed from the periphery of the receptacle onto the platform 103, thence individually by way of the scoop 104 into a position adjacent the tube 91.

The horizontal portion 111 of the platform is spaced from the wall of the hopper, providing an annular space indicated at 112 to facilitate the passage of broken pieces or fragments of glass bodies into the zone in the hopper beneath the platform. An annular space 114 is provided between the lower edge 29' of the receptacle and the exterior wall of the tube 91 to accommodate the passage of the broken pieces or fragments from the receptacle into a waste receptacle or container 115 surrounding the tube 91. The container 115 may be provided with a chute 116 for conveying the fragments to a zone remote from the receptacle.

The arrangement of cam means and marble release or metering rod is substantially the same as the corresponding mechanism shown in Figure 2. The hopper 25' may be equipped with heating means 74' for preheating the pieces or marbles of glass in the manner hereinbefore described in connection with the form shown in Figure 2.

It is apparent that, within the scope of the invention, modifications and different arrangements may be made other than is herein disclosed, and the present disclosure is illustrative merely, the invention comprehending all variations thereof.

We claim:

1. Apparatus for successively transferring spherically shaped pieces of heat-softenable, fiber-forming material at intervals from a supply to a melting zone including, in combination, a receptacle adapted to contain a supply of the pieces of material, said receptacle having a portion defining an opening, relatively rotatable piece supporting means in said receptacle, said means including a tubular portion and a generally circular flange portion extending outwardly therefrom and adapted to support pieces of the material, the wall of the tubular portion being formed with a passage to admit pieces to the interior of the tubular portion for delivery into the melting zone, said flange portion being shaped to direct pieces of the material toward the passage in the wall of the tubular portion, means for rotating the piece supporting means about the axis of the tubular portion, means disposed within the tubular portion normally obstructing movement of the pieces through the passage, means for intermittently effecting relative movement between the piece obstructing means and the tubular portion to permit movement of a piece of material into the tubular portion, said flange portion defining with the wall of the receptacle at the opening a space through which undersized or broken pieces are discharged from the receptacle exteriorly of the tubular portion.

2. Apparatus for successively transferring spherically shaped pieces of heat-softenable, fiber-forming material at intervals from a supply to a melting chamber including, in combination, a receptacle disposed adjacent and above the melting chamber adapted to contain a supply of the pieces of material, said receptacle having a wall portion defining an opening, relatively rotatable piece supporting means in said receptacle, said means including a tubular portion in substantially vertical alignment with the melting chamber and a generally circular flange portion extending outwardly therefrom and adapted to support pieces of the material, the wall of the tubular portion being formed with a passage to admit pieces to the interior of the tubular portion, said flange portion being shaped to direct pieces of the material toward the passage in the wall of the tubular portion, means for rotating the piece supporting means about the axis of the tubular portion, means disposed within the tubular portion normally obstructing movement of the pieces through the passage, means for intermittently effecting relative movement between the piece obstructing means and the tubular portion to permit movement of a piece of material into the tubular portion, said flange portion defining with the wall of the receptacle at the opening an annular space through which undersized or broken pieces are discharged from the receptacle exteriorly of the tubular portion.

3. Apparatus for successively transferring spherically shaped pieces of glass at intervals from a supply to a melting chamber including, in combination, a receptacle disposed adjacent and above the melting chamber adapted to contain a supply of the pieces of material, said receptacle having a portion defining an opening, relatively rotatable piece supporting means in said receptacle, said means including a tubular portion in substantially vertical alignment with the melting chamber and a generally circular flange portion extending outwardly therefrom and adapted to support pieces of the material, the wall of the tubular portion being formed with a passage to admit pieces to the interior of the tubular portion, said flange portion being shaped to direct pieces of the material toward the passage in the wall of the tubular portion, means for rotating the piece supporting means about the axis of the tubular portion, means disposed within the tubular portion normally obstructing movement of the pieces through the passage, means for intermittently changing the position of the piece obstructing means relative to the tubular portion to permit movement of a piece of material into the tubular portion, said flange portion defining with the wall of the receptacle at the opening an annular space through which undersized or broken pieces are discharged from the receptacle exteriorly of the tubular portion, and controllable means for heating the pieces of glass in the receptacle to a temperature approaching but below the softening temperature of the glass to reduce thermal shock in the melting chamber upon delivery of pieces of glass into the chamber.

4. Apparatus for successively transferring pieces of material at predetermined intervals from a supply to a zone remote therefrom including, in combination, a receptacle adapted to contain a supply of the pieces of material, said receptacle having a portion defining a circular opening, relatively rotatable means disposed in said receptacle and having a portion adjacent the opening, said means including a tube extending through the receptacle, said tube having a passage in a wall thereof to admit pieces of material from the receptacle into the tube, means formed upon said portion for guiding pieces toward the opening in the tube, means disposed adjacent the tube normally obstructing movement of the pieces through the passage, and means for intermittently causing relative movement of said piece obstruction means to permit movement of a piece of material into the tube, the portion of the relatively rotatable means defining with the wall of the circular opening an annular space through which undersized or broken pieces are discharged from the receptacle exteriorly of the tube.

5. Apparatus for successively transferring pieces of material of substantially uniform size at predetermined intervals from a supply to a zone remote therefrom including, in combination, a receptacle adapted to contain a supply of the pieces of material, said receptacle having a frusto-conically shaped portion for directing pieces of the material toward the central zone of the receptacle, the terminus of the wall of the frusto-conically shaped portion defining a circular opening, a relatively rotatable means in the receptacle having a disc-like portion disposed in said opening and a tube extending through the receptacle, said tube having a passage in a wall thereof to admit pieces of material from the receptacle into the tube, means associated with the disc-like portion for guiding pieces toward the passage in the tube, an element disposed within the tube normally obstructing movement of the pieces through the passage, and means for intermittently actuating said piece obstruction means to permit movement of a piece of material through the passage into the tube, the periphery of said disc-like portion and the wall of the circular opening being spaced to provide support for an annular row of pieces of uniform size, the said space adjacent the periphery of the disc-like portion permitting the discharge of undersized or fragments of pieces exteriorly of the tube.

6. Apparatus for delivering spherically shaped bodies of substantially uniform size from a supply to a zone remote therefrom including, in combination, a receptacle having a frusto-conically shaped portion adapted to contain a supply of the spherically shaped bodies, a tube extending through said receptacle and being disposed axially of the frusto-conically shaped portion of the receptacle, an element secured to the tube, the wall of the tube being formed with a passage, means formed on said element providing a path for guiding bodies in said receptacle to the zone of the passage in the tube, means for rotating the tube and element, means associated with said tube normally obstructing movement of the bodies through the passage in the tube, and means for periodically actuating the body obstructing means to permit a body from the supply to move into the tube, said element and a portion of the receptacle being disposed to provide an annular space therebetween of a dimension to prevent spherically shaped bodies of uniform size from moving through the annular space, said annular space permitting the movement of undersized or fragments of bodies to move therethrough.

7. Apparatus for delivering spherically shaped bodies of substantially uniform size from a supply to a zone remote therefrom including, in combination, a receptacle having a frusto-conically shaped portion adapted to contain a supply of the spherically shaped bodies, a tube extending through said receptacle and being disposed axially of the frusto-conically shaped portion of the receptacle, an element secured to the tube, the wall of the tube being formed with a passage, means formed on said element providing a path for guiding bodies in said receptacle to the zone of the passage in the tube, means for rotating the tube and element, means including a member associated with said tube normally obstructing movement of the bodies through the passage in the tube, means for periodically causing relative movement of the body obstructing means to permit a body from the supply to move through the passage into the tube, said element and a portion of the receptacle being disposed to provide an annular space therebetween of a dimension to prevent spherically shaped bodies of uniform size from moving through the annular space, said annular space permitting the discharge of undersized or fragments of bodies exteriorly of the tube, and means disposed adjacent the annular space to receive undersized bodies and fragments of bodies discharged therethrough.

8. Apparatus for delivering spherical bodies of heat-softenable material of substantially uniform size from a supply to a zone remote therefrom including, in combination, a receptacle having a frusto-conically shaped portion adapted to contain a supply of the bodies, a tube extending through said receptacle and being disposed axially of the frusto-conically shaped portion of the receptacle, a disc-like element secured to the tube, a passage formed in the wall of the tube, a channel formed on said element providing a path for guiding bodies in said receptacle to the zone of the passage in the tube, means for rotating the tube and element, a reciprocable rod in said tube normally obstructing movement of the bodies through the passage in the tube, means for periodically reciprocating the rod to permit a body from the supply to move into the tube, said element and hopper being disposed to provide an annular space therebetween of a dimension to normally prevent spherically shaped bodies from moving through the annular space, said annular space permitting the movement of undersized or fragments of bodies to move therethrough, and means for heating the bodies in the receptacle to a temperature approaching but below the softening point of the material before their discharge from the receptacle.

9. Apparatus of the character disclosed including, in combination, a hopper having a portion of reduced size, said hopper adapted to contain a supply of spherical glass bodies, a tube disposed in the hopper and extending therethrough, means for rotating the tube, an element carried by the tube and rotatable therewith, the wall of the tube having a passage formed therein, guide means formed on said element for directing bodies in the hopper toward the passage in the tube wall, a rod disposed interiorly of the tube and normally obstructing movement of bodies through the passage into the tube, and means for causing relative movement of the rod to permit successive movement of bodies into the tube, said element and reduced portion of the hopper being arranged to provide an annular space, said element and said hopper adapted to support an annular row of bodies adjacent the annular space, said annular space being of a dimension to obstruct movement of the spherical bodies therethrough and to permit undersized bodies and fragments of bodies to be discharged therethrough from the hopper.

10. Apparatus of the character disclosed including, in combination, a hopper having a portion of reduced size, said hopper adapted to contain a supply of spherical glass bodies, a tube disposed in the hopper and extending therethrough, means for rotating the tube, an element carried by the tube and rotatable therewith, the wall of the tube having a passage formed therein, guide means formed on said element for directing bodies in the hopper toward the passage in the tube, a reciprocable rod disposed interiorly of the tube and normally obstructing movement of bodies through the passage into the tube, means for reciprocating the rod to permit movement of bodies selectively into the tube, said element and reduced portion of the hopper being disposed to provide an annular space, said element and said hopper arranged to support an annular row of bodies adjacent the annular space, said annular space being of a dimension to obstruct movement of the spherical bodies therethrough and to permit undersized bodies and fragments of bodies to be discharged therethrough from the hopper, and a plate disposed in the hopper adjacent the element, said plate having an opening therein to admit the passage of bodies disposed above the plate to the annular space adjacent the element to replace bodies discharged into the tube.

11. Apparatus of the character disclosed including, in combination, a hopper having a portion of reduced size, said hopper adapted to contain a supply of spherical glass bodies, a tube disposed in the hopper and extending therethrough, means for rotating the tube, an element carried by the tube and rotatable therewith, the wall of the tube having a passage formed therein, guide means formed on said element for directing bodies in the hopper toward the passage in the tube, a reciprocable rod disposed interiorly of the tube and normally obstructing movement of bodies through the passage into the tube, cam means for reciprocating the rod to permit movement of bodies selectively into the tube, said element and reduced portion of the hopper being arranged to provide an annular space, said element and said hopper adapted to support an annular row of bodies adjacent the annular space, said annular space being of a dimension to obstruct movement of the spherical bodies therethrough and to permit undersized bodies and fragments of bodies to be discharged therethrough from the hopper, a plate member disposed in the hopper adjacent the element, said plate having an opening therein to admit the passage of bodies disposed above the plate to the annular space adjacent the element to replace bodies discharged into the tube, and means associated with the hopper for heating the glass bodies before they are discharged from the hopper.

References Cited in the file of this patent

UNITED STATES PATENTS

| | | |
|---|---|---|
| 617,990 | Meischner | Jan. 17, 1899 |
| 759,811 | Graham | May 10, 1904 |
| 1,051,075 | Breen | Jan. 21, 1913 |
| 1,694,691 | Rentz | Dec. 11, 1928 |
| 1,738,680 | Wineman | Dec. 10, 1929 |
| 2,190,084 | Schlumbohm | Feb. 13, 1940 |
| 2,428,228 | Keck | Sept. 30, 1947 |
| 2,453,864 | Schlehr | Nov. 16, 1948 |
| 2,482,071 | Simison | Sept. 13, 1949 |
| 2,510,658 | Rassmann | June 6, 1950 |
| 2,544,091 | Jordan | Mar. 6, 1951 |
| 2,635,389 | Toulmin | Apr. 21, 1953 |
| 2,667,961 | Reese | Feb. 2, 1954 |